United States Patent
Jiang et al.

(10) Patent No.: US 7,870,567 B2
(45) Date of Patent: Jan. 11, 2011

(54) CONFIGURING A DEVICE USING INFORMATION FROM A DEVICE TABLE

(75) Inventors: Pinshan Jiang, San Jose, CA (US); Hunny Wiratchada Kershaw, San Jose, CA (US); Jamee Kim Lee, San Jose, CA (US); Stanley Yi-Hsiung Wu, San Jose, CA (US); Rong Zeng, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1629 days.

(21) Appl. No.: 11/113,940

(22) Filed: Apr. 25, 2005

(65) Prior Publication Data

US 2006/0238791 A1    Oct. 26, 2006

(51) Int. Cl.
  *G06F 9/46* (2006.01)
  *G06F 3/00* (2006.01)
  *G06F 15/16* (2006.01)

(52) U.S. Cl. ............... 719/327; 710/1; 710/38; 709/230

(58) Field of Classification Search .......... None
See application file for complete search history.

(56) References Cited

U.S. PATENT DOCUMENTS

| | | | |
|---|---|---|---|
| 5,548,783 | A | 8/1996 | Jones et al. |
| 6,145,028 | A | 11/2000 | Shank et al. |
| 6,549,978 | B2 | 4/2003 | Mansur et al. |
| 6,658,489 | B1 | 12/2003 | Asselin |
| 2002/0122068 | A1 * | 9/2002 | Tsuruoka ............... 345/810 |
| 2003/0088711 | A1 | 5/2003 | Tabares et al. |
| 2003/0195951 | A1 | 10/2003 | Wittel et al. |
| 2003/0233487 | A1 | 12/2003 | Ruget et al. |

OTHER PUBLICATIONS

"AIX 5L for Itanium-based Systems Device Driver Kit", Apr. 2001, IBM, second edition, 421pp.*
IBM Corp., "AIX 5L for Itanium-based Systems Device Driver Kit", pp. 1-6, [retrieved online Mar. 7, 2005] Retrieved from the Internet at http://publibn.boulder.ibm.com/doc_link/en_US/a_doc_lib/devdrive/ddn...
IBM Corp., "Technical Reference:Kernel and Subsystems, vol. 2", pp. 1-4,[retrieved online Mar. 7, 2005] Retrieved from the Internet at http://publib16.boulder.ibm.com/pseries/en_US/libs/ktechrf2/Writing_ConfigureMethod.htm.
Communication Pursuant to Article 94(3) EPC, dated Jun. 17, 2009, for Application No. 06 743 376.3-2211, 3 pp.

(Continued)

*Primary Examiner*—Lechi Truong
*Assistant Examiner*—Tuan Dao
(74) *Attorney, Agent, or Firm*—David W. Victor; Konrad Raynes and Victor LLP

(57) ABSTRACT

Provided are a method, system, and program for configuring a device using information from a device table. Device information is obtained for a device coupled to a system. The device information is provided to a device driver executing in the system. The device driver calls a method in response to determining the device driver does not support the device identified by the device information. The method provides device configuration information from a device table to the device driver. The device driver uses the device configuration information in the device table to configure the device for use in the system.

24 Claims, 3 Drawing Sheets

OTHER PUBLICATIONS

PCT Search Report and Written Opinion for Application No. PCT/EP2006/061760, filed Apr. 21, 2006, dated Sep. 7, 2006.

Russinovich, et al., "Microsoft Windows Internals 4" Ed Windows Server 2003, Windows XP and . . . ", Microsoft, Dec. 2004, pp. 589-606.

Response to German Office Action, dated Oct. 13, 2009, for Application No. SJO920040101EP1, 4 pp.

China Patent Office document listing cited references, Aug. 22, 2008, 1 pp.

Office Communication for Application 06743376.3-2211, May 29, 2008, 2 pp.

Communication pursuant to Article 94(3) EPC for Application 06 743 376.3- 2211 filed Jan. 2, 2008, 6 pp.

\* cited by examiner

Device Table Entry

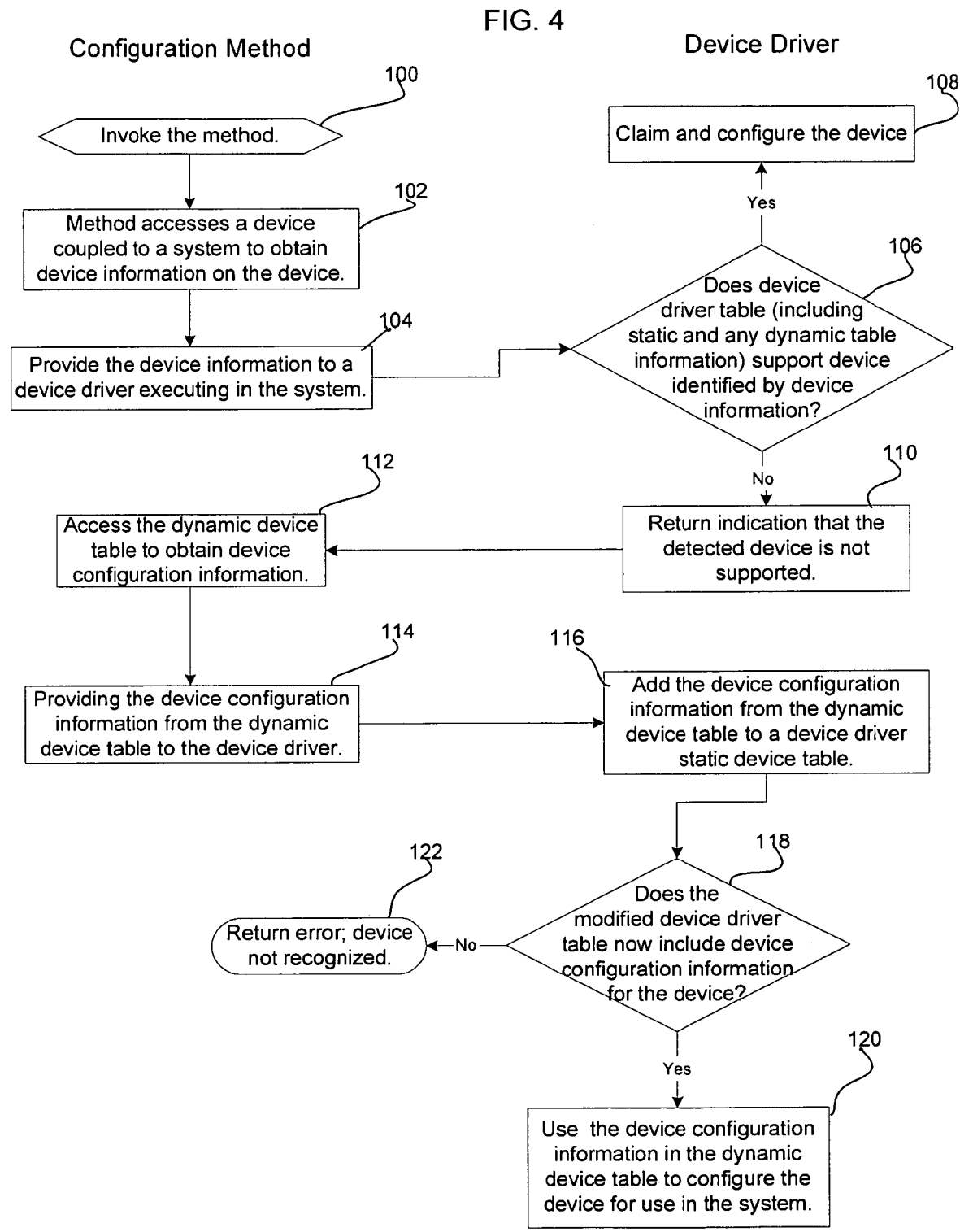

CONFIGURING A DEVICE USING INFORMATION FROM A DEVICE TABLE

BACKGROUND OF THE INVENTION

1. Field of the Invention

The present invention relates to a method, system, and program for configuring a device using information from a device table.

2. Description of the Related Art

When a device connected to a system via an interface is detected, which may occur when a device is added during runtime or during system initialization, a configuration method program determines whether the loaded device driver is capable of supporting the detected device, such as a storage or other Input/Output (I/O) device. The configuration method issues standard (e.g., Small Computer System Interface (SCSI)) inquiry commands to the device to determine the vendor and product identifiers of the device. The configuration method may also issue additional commands to a storage device, such as: the mode sense command to determine the media format for tape or optical devices; the report target group command to determine the LUN/port affinity for disk devices; the read element status command to determine the element locations for the media changer devices; etc. If a device table used by the device driver includes information for the detected device, then the device driver may configure and use the device. Otherwise, if the device table does not provide information for the detected device, then a new device driver must be installed. The device driver installation process varies between operating systems. With some operating systems, in order to use the device, the system must reboot so that the current device driver and device table are unloaded and then uninstalled so that a new device driver with the updated device table including device configuration information for the detected new device type are loaded into the kernel to make the device available to the system. In other operating systems in which reboot is not required, the device driver and the device table are still unloaded so a new device driver and the device table supporting the detected device may be loaded and used. Unloading the device driver with or without reboot interrupts system operations and interferes with goals of 24 by 7 availability.

SUMMARY

Provided are a method, system, and program for configuring a device using information from a device table. Device information is obtained for a device coupled to a system. The device information is provided to a device driver executing in the system. The device driver calls a method in response to determining the device driver does not support the device identified by the device information. The method provides device configuration information from a device table to the device driver. The device driver uses the device configuration information in the device table to configure the device for use in the system.

BRIEF DESCRIPTION OF THE DRAWINGS

FIG. 4 illustrates an embodiment of operations to update a device table used by a device driver.

DETAILED DESCRIPTION

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
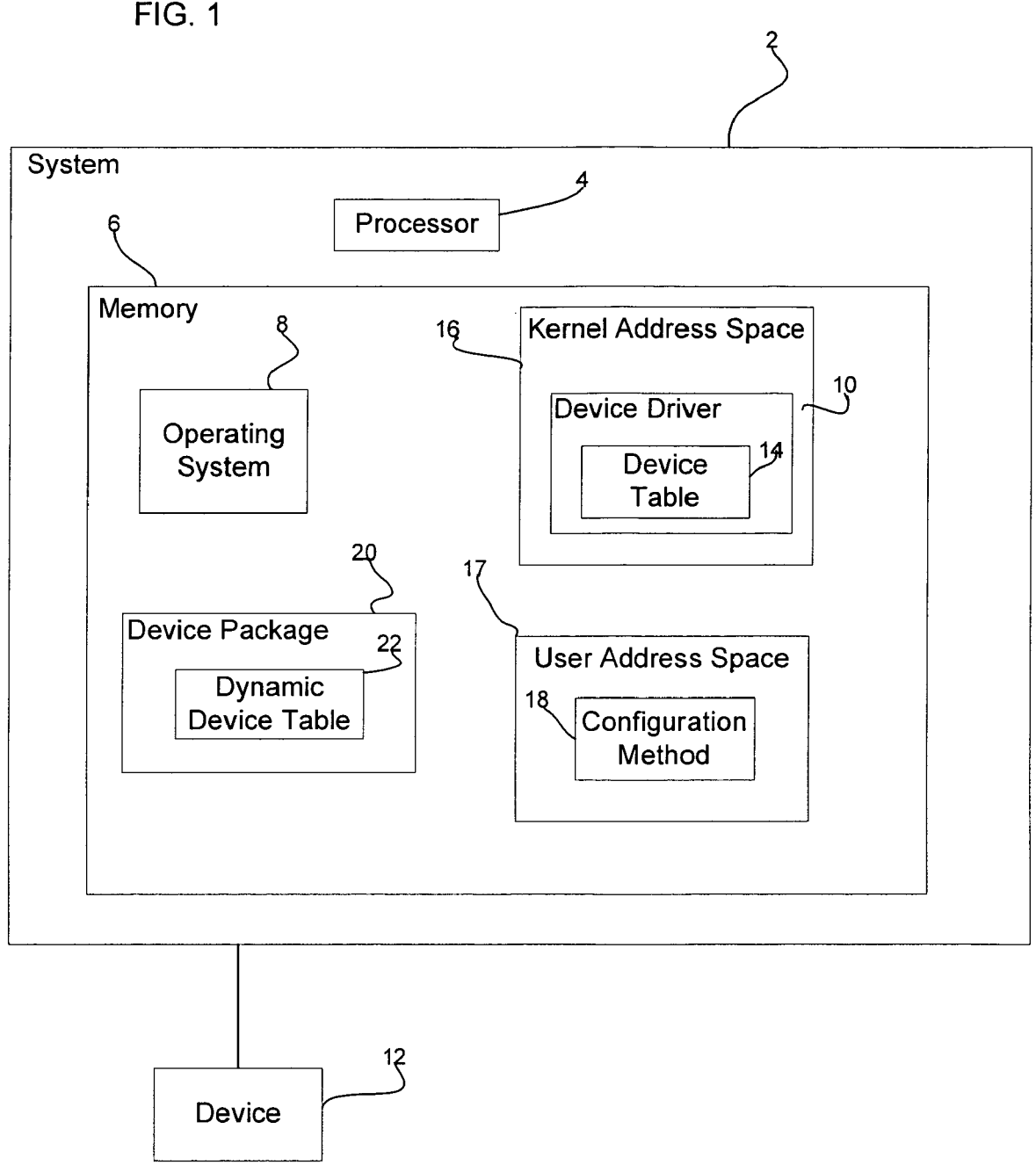
FIG. 1 illustrates an embodiment of a storage computing environment.

FIG. 1 illustrates a computing environment having a system 2 including a processor 4 and memory 6. The memory 6 includes an operating system 8 and device driver 10 providing support for one or more attached devices 12. The device driver 10 is capable of accessing devices whose device configuration information is maintained in a device table 14 accessible to the device driver 10. The device driver 10 and device table 14 are loaded into and execute in a kernel address space 16. In FIG. 1, the device table 14 is shown as a component within the device driver 10. In an alternative embodiment, the device table 14 may be located external to the device driver 10. The application processes and threads may communicate to the device through the kernel space device driver 10.

A configuration method 18 is invoked to configure devices and provide the device driver 10 with information on available devices 12. The configuration method 18 may execute in a user address space 17 or, in alternative embodiments, the kernel address space 16, depending on the operating system requirements. The configuration method 18 is invoked to configure an attached device 12. A vendor of the device 12 may provide a device package 20 that includes a dynamic device table 22 including device configuration information for the device. The configuration method 18 may add the device configuration information from the dynamic device table 22 to the device driver 10. The device driver 10 can then use the device configuration information in the dynamic device table 22 to configure and communicate with the device 12.

Figure 2:
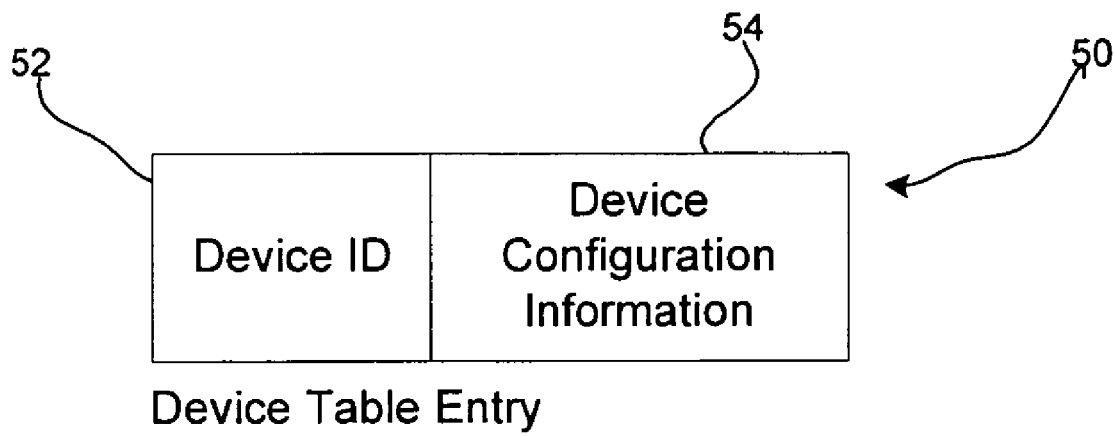
FIG. 2 illustrates an embodiment of a device table entry.

FIG. 2 illustrates an embodiment of a device table entry 50 maintained in the device table 14 and dynamic device table 22. A device table entry 50 includes a device identifier 52 of a device 12, such as a vendor ID, product ID, and/or world wide name, and device configuration information 54 comprising information needed to configure and access the device 12. The device configuration information 54 may include: a storage media format, e.g., tape format, optical disk drive format, etc., Logical Unit Number (LUN)/port affinity, element locations, etc.; and the SCSI commands used to determine the storage media format and set the characteristics of the device operation; offset, length and other information to assist the device driver 10 in interpreting the data retrieved using the specified commands; etc.

Figure 3:
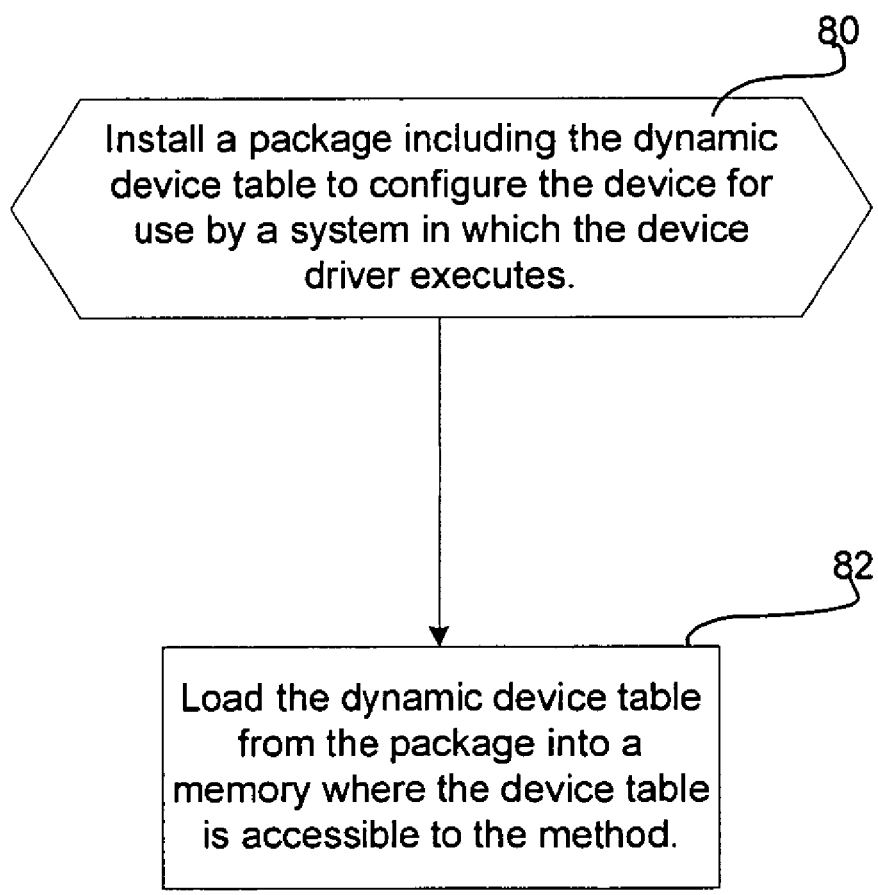
FIG. 3 illustrates an embodiment of operations to install a device package.

FIG. 3 illustrates an embodiment of operations to provide new device configuration information in a device package 20. A user may install (at block 80) a device package 20 including the dynamic device table 22 having the device configuration information for the new device 12. The device package 20 may comprise an executable file. In response to invoking the device package 20, the dynamic device table 22 is loaded (at block 82) from the package 20 into the memory 6 where the dynamic device table 22 is accessible to the configuration method 18.

FIG. 4 illustrates an embodiment of operations performed by the configuration method 18 and the device driver 10 to configure a device 12 coupled to the system 2. The device 12 may be coupled to the system 2 via a physical interface, cables, wires or wireless communication. Control begins at block 100 with the configuration method 18 being invoked.

The configuration method 18 may be invoked upon detecting the coupling of the device 12 to the system 2 during runtime, system initialization, system boot or in response to a user or system 2 invocation. The configuration method 18 accesses (at blocks 102) the device 12 coupled to the system 2 to obtain device information on the device. The configuration method 18 may obtain device information by issuing a standard (e.g., SCSI) command to determine vendor and product identifiers. In an alternative embodiment, the configuration method 18 may access the device information from a data structure in the system 2 or some other location without directly accessing the device. The configuration method may also issue additional commands to a storage device, such as to determine the media format (e.g., a mode sense command), the LUN/port affinity for tape or optical devices (e.g., the report target group command), etc.

The configuration method 18 provides (at block 104) the obtained device information to the device driver 10 to configure the device 12. In response to the device identification information, the device driver 10 determines (at block 106) whether the device driver table 14 supports the device 12 identified by the device information. In one embodiment, the device driver 10 may support the detected device if there is an entry 50 in the device table 14 providing device specific information for that device. The device table 14 may include static device information from the initial package of the device driver 10. After the device driver 10 has been updated with configuration information from a dynamic device table 22, then the device driver table 14 processed at block 106 has both static and dynamic device table 22 information. If (at block 106) the device driver 10 supports the device 12, then the device driver 10 claims (at block 108) and configures that device 12. Otherwise, if the device driver 10 does not support the identified device 12, i.e., the device table 14 used by the device driver 10 does not include product data for the device, then the device driver 10 returns (at block 110) indication to the configuration method 18 that the detected device 12 is not supported.

The configuration method 18 accesses (at block 112) any dynamic device tables 22 loaded into the memory 6 to obtain device configuration information. The configuration method 18 provides (at block 114) the device configuration information from the dynamic device table 22 to the device driver 10. The device driver 10 (or configuration method 18) adds (at block 116) the device configuration information from the dynamic device table 22 to the device table 14, resulting in an extended device table 14 having both the static and dynamic device information. In one embodiment, the configuration method 18 may provide device table entries 50 from the dynamic device table 22 to the device table 14 used by the device driver 10 in the kernel address space 16. If (at block 118) the modified or extended device driver table 14 now includes device configuration information for the device 12, then the device driver 10 uses (at block 120) the device configuration information added to the device table 14 to configure and access the device. Otherwise, if the device is still not supported, then an error is returned (at block 122) indicating that the device is not supported.

In certain embodiments, the operations described with respect to FIG. 4 are performed in a runtime environment without rebooting the operating system 8 or without unloading the device driver and reloading a new device driver so that the system 2 remains online and available while the device table 14 in the kernel address space 16 is being updated with device configuration information for a new device. Described embodiments describe techniques to allow an update to the device table 14 of a device driver without having to reinstall the device drivers. In certain embodiments, the system 2 may remain operable when updating the device table 14 to help achieve the goal of 24-7 operability, i.e., operable 24 hours a day, seven days a week.

Additional Embodiment Details

The described operations may be implemented as a method, apparatus or article of manufacture using standard programming and/or engineering techniques to produce software, firmware, hardware, or any combination thereof. The term "article of manufacture" as used herein refers to code or logic implemented in a tangible medium, where such tangible medium may comprise hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The tangible medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

In FIGS. 3 and 4, certain operations were described as performed by a configuration method or a device driver. In alternative embodiments, certain operations described as performed by the configuration method may be performed by the device driver and operations described as performed by the device driver may be performed by the configuration method.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer readable storage device storing code executed in a system coupled to a device, wherein the code includes a device driver, a configuration method, and a device table, and is executed to:
    performing operations while the device driver remains loaded and executing in a runtime environment, the operations comprising:
    accessing device information on the device during runtime operations;
    providing the device information to the device driver executing in the system;
    calling, by the device driver, the configuration method in response to determining that a first device table used by the device driver does not support the device identified by the device information;
    providing, by the configuration method, device configuration information from a second device table to the device driver;
    adding, by the device driver, the device configuration information provided by the configuration method to the first device table;
    and using, by the device driver, the device configuration information in the first device table to configure the device for use in the system.

2. The computer readable storage device of claim 1, wherein the operations of providing the device information, calling the configuration method, providing the configuration information from the second device table, and using the device configuration information are performed without unloading the device driver and reloading a new device driver, wherein the system remains online and available while the first device table is updated with the device configuration information for the device.

3. The computer readable storage device of claim 1, wherein the code is in communication with a memory, wherein the operations further comprise:
    installing a package including the second device table;
    loading the second device table from the package into the memory where the second device table is accessible to the configuration method; and
    invoking the configuration method, wherein the invoked configuration method accesses the device information to provide to the device driver.

4. The computer readable storage device of claim 1, wherein the first device table is loaded in a kernel address space and used by the device driver operating in the kernel address space to access devices.

5. The computer readable storage device of claim 4, wherein the configuration method executes in a user address space.

6. The computer readable storage device of claim 1, wherein the device information obtained from the device identifies the device, wherein the device configuration information in the first device table includes at least one of: device commands; attributes of device information; attributes of a medium read by the device; information used to interpret data retrieved from the device using device commands.

7. The computer readable storage device of claim 1, wherein the configuration method accesses the device to obtain device information in response to detecting the device being coupled to the system, and wherein the configuration method provides the accessed device information from the device to the device driver.

8. The computer readable storage device of claim 1, wherein the configuration method is external to the device driver.

9. A system coupled to a device, comprising:
    a computer processor;
    a computer memory storing code executed by the computer processor, wherein the code includes a device driver, a configuration method, first device table, and a second device table, wherein the code is executed while the device driver remains loaded and executing in a runtime environment to perform
    accessing device information on the device during runtime operations;
    providing the device information to the device driver;
    calling, by the device driver, the configuration method in response to determining that a first device table used by the device driver does not support the device identified by the device information;
    providing, by the configuration method, device configuration information from the second device table to the device driver;
    adding, by the device driver, the device configuration information provided by the configuration method to the first device table;
    and using, by the device driver, the device configuration information in the first device table to configure the device for use in the system.

10. The system of claim 9, wherein the operations of providing the device information, calling the configuration method, providing the configuration information from the second device table, and using the device configuration information are performed without unloading the device driver and reloading a new device driver, wherein the system remains online and available while the first device table is updated with the device configuration information for the device.

11. The system of claim 9, wherein the operations further comprise:
 executing a package including the second device table;
 loading the second device table from the package into the memory where the second device table is accessible to the configuration method; and
 invoking the configuration method, wherein the invoked configuration method accesses the device to obtain the device information to provide to the device driver.

12. The system of claim 9, wherein the first device table is loaded in a kernel address space and used by the device driver operating in the kernel address space to access devices.

13. The system of claim 12, wherein the configuration method executes in a user address space.

14. The system of claim 9, wherein the device information obtained from the device identifies the device, wherein the device configuration information in the first device table includes at least one of: device commands; attributes of device information; attributes of a medium read by the device; information used to interpret data retrieved from the device using device commands.

15. The system of claim 9, wherein the configuration method accesses the device to obtain device information in response to detecting the device being coupled to the system, and wherein the configuration method provides the accessed device information from the device to the device driver.

16. The system of claim 9, wherein the configuration method is external to the device driver.

17. A method, comprising:
 performing operations while a device driver remains loaded and executing in a runtime environment in a system, the operations comprising:
 accessing device information on a device coupled to the system during the runtime operations;
 providing the device information to the device driver executing in the system;
 calling, by the device driver, a configuration method in response to determining that a first device table used by the device driver does not support the device identified by the device information;
 providing, by the configuration method, device configuration information from a second device table to the device driver;
 adding, by the device driver, the device configuration information provided by the configuration method to the first device table;
 and using, by the device driver, the device configuration information in the device table to configure the device for use in the system.

18. The method of claim 17, wherein the operations of providing the device information, calling the configuration method, providing the configuration information from the second device table, and using the device configuration information are performed without unloading the device driver and reloading a new device driver, wherein the system remains online and available while the first device table is updated with the device configuration information for the device.

19. The method of claim 17, further comprising:
 installing a package including the second device table;
 loading the second device table from the package into a memory where the second device table is accessible to the configuration method; and
 invoking the configuration method, wherein the invoked configuration method accesses the device to obtain the device information to provide to the device driver.

20. The method of claim 17, wherein the first device table is loaded in a kernel address space and used by the device driver operating in the kernel address space to access devices.

21. The method of claim 20, wherein the configuration method executes in a user address space.

22. The method of claim 17, wherein the device information obtained from the device identifies the device, wherein the device configuration information in the first device table includes at least one of: device commands; attributes of device information; attributes of a medium read by the device; information used to interpret data retrieved from the device using device commands.

23. The method of claim 17, wherein the configuration method accesses the device to obtain device information in response to detecting the device being coupled to the system, and wherein the configuration method provides the accessed device information from the device to the device driver.

24. The method of claim 17, wherein the configuration method is external to the device driver.

* * * * *